(12) United States Patent
Chen

(10) Patent No.: US 11,249,222 B2
(45) Date of Patent: Feb. 15, 2022

(54) OPTICAL FILM AND MANUFACTURING METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Pengming Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 893 days.

(21) Appl. No.: 16/067,745

(22) PCT Filed: Dec. 12, 2017

(86) PCT No.: PCT/CN2017/115589
§ 371 (c)(1),
(2) Date: Jul. 2, 2018

(87) PCT Pub. No.: WO2018/205595
PCT Pub. Date: Nov. 15, 2018

(65) Prior Publication Data
US 2021/0199853 A1    Jul. 1, 2021

(30) Foreign Application Priority Data
May 9, 2017   (CN) .......................... 201710322029.5

(51) Int. Cl.
*G02B 1/00*   (2006.01)
*B82Y 20/00*  (2011.01)
(Continued)

(52) U.S. Cl.
CPC .............. *G02B 1/005* (2013.01); *B82Y 20/00* (2013.01); *G02B 5/1809* (2013.01);
(Continued)

(58) Field of Classification Search
CPC .... G02B 1/005; G02B 6/0036; G02B 6/0016; G02B 5/1809; G02B 30/00; G02B 35/33;
(Continued)

(56) References Cited

U.S. PATENT DOCUMENTS

| 2005/0220402 | A1* | 10/2005 | Takagi | G02F 1/011 |
| | | | | 385/31 |
| 2007/0058258 | A1* | 3/2007 | Mather | G02B 30/27 |
| | | | | 359/619 |

(Continued)

FOREIGN PATENT DOCUMENTS

| CN | 104280889 A * | 1/2015 |
| CN | 104280889 A | 1/2015 |

(Continued)

OTHER PUBLICATIONS

Du, English translation of CN-104280889-A (Year: 2015).*
(Continued)

*Primary Examiner* — Michael H Caley
*Assistant Examiner* — Jonathan Y Jung
(74) *Attorney, Agent, or Firm* — Leason Ellis LLP

(57) ABSTRACT

An optical film, a manufacturing method thereof and a display device are provided. The optical film includes a photonic crystal film substrate and a plurality of linear defective portions penetrating the photonic crystal film substrate in a thickness direction in the photonic crystal film substrate. A lattice period of each of the linear defective portions is different from a lattice period of the photonic crystal film substrate, and the photonic crystal film substrate includes a plurality of first regions and a plurality of second regions. The first regions and the second regions are alternately distributed along at least one direction in a plane where the photonic crystal thin film is located. The linear defective portion located in each of the first regions has a (Continued)

first light exiting direction. The linear defective portion in each of the second regions has a second light exiting direction.

14 Claims, 4 Drawing Sheets

(51) Int. Cl.
   *H04N 13/32* (2018.01)
   *H04N 13/302* (2018.01)
   *H04N 13/349* (2018.01)
   *G02B 30/00* (2020.01)
   *G02B 5/18* (2006.01)
   *F21V 8/00* (2006.01)
   *H04N 13/00* (2018.01)

(52) U.S. Cl.
   CPC .......... *G02B 6/0016* (2013.01); *G02B 6/0036* (2013.01); *G02B 30/00* (2020.01); *H04N 13/00* (2013.01); *H04N 13/302* (2018.05); *H04N 13/32* (2018.05); *H04N 13/349* (2018.05)

(58) Field of Classification Search
   CPC ........ B82Y 20/00; H04N 13/00; H04N 13/32; H04N 13/302; H04N 13/349
   See application file for complete search history.

(56) References Cited

U.S. PATENT DOCUMENTS

| | | | |
|---|---|---|---|
| 2009/0190072 A1* | 7/2009 | Nagata | G02B 6/0028 349/96 |
| 2011/0108779 A1* | 5/2011 | Han | G02B 1/005 252/582 |
| 2012/0032931 A1 | 2/2012 | Li et al. | |
| 2017/0276614 A1* | 9/2017 | Bovero | G01L 1/00 |
| 2017/0363794 A1* | 12/2017 | Wan | H04N 13/349 |
| 2018/0149875 A1 | 5/2018 | Gao et al. | |

FOREIGN PATENT DOCUMENTS

| | | |
|---|---|---|
| CN | 104536069 A | 4/2015 |
| CN | 105572889 A | 5/2016 |
| CN | 205318033 U | 6/2016 |
| CN | 106019649 A | 10/2016 |
| JP | 2002122837 A | 4/2002 |

OTHER PUBLICATIONS

Chinese Office Action in corresponding Chinese Application No. 201710322029.5 dated Sep. 9, 2019 (an English translation attached hereto). 19 pages.
International Search Report and Written Opinion in corresponding International Patent Application No. PCT/CN2017/115589, dated Mar. 9, 2018. 22 pages. (An English translation attached.).

* cited by examiner

OPTICAL FILM AND MANUFACTURING METHOD THEREOF AND DISPLAY DEVICE

CROSS-REFERENCE TO RELATED PATENT APPLICATIONS

The application is a U.S. National Stage Application under 35 U.S.C. § 371 of International Patent Application No. PCT/CN2017/115589 filed Dec. 12, 2017, which claims priority to the Chinese patent application No. 201710322029.5, filed on May 9, 2017, both of which are incorporated herein by reference in their entireties as part of the present application.

TECHNICAL FIELD

Embodiments of the present disclosure relate to an optical film, a manufacturing method thereof, and a display device.

BACKGROUND

The on-board display device is a display device that can be used on cars and other vehicles. The on-board display device can display a map, a rear view, and video content, thus, the on-board display device has a large market space.

Because a liquid crystal display or an organic light emitting display has a relatively small size, it is easy to be installed on a car or other vehicles. Therefore, a typical on-board display can adopt a liquid crystal display or an organic light emitting display. In general, the on-board display device can be installed near the dashboard, on the roof, behind the seat back, or even on the sun visor to facilitate use in various situations.

SUMMARY

The embodiments of the present disclosure provide an optical film, a manufacturing method thereof and a display device. The optical film can block visible light from passing through by adjusting a band gap range of a photonic crystal film substrate, and can form light passages through linear defective portions having different lattice periods, so that light can be transmitted in a specific direction. In addition, because a linear defective portion located in a first region and a linear defective portion located in a second region have different light exiting directions, and the optical film can be employed to achieve dual view display.

At least one embodiment of the present disclosure provides an optical film, comprising: a photonic crystal film substrate and a plurality of linear defective portions, located in the photonic crystal film substrate and penetrating the photonic crystal film substrate in a thickness direction of the photonic crystal film substrate; a lattice period of each of the linear defective portions is different from a lattice period of the photonic crystal film substrate, and the photonic crystal film substrate comprises a plurality of first regions and a plurality of second regions, and the plurality of first regions and the plurality of second regions are alternately distributed along at least one direction in a plane where the photonic crystal film substrate is located, the linear defective portions located in the plurality of first regions have a first light exiting direction, and the linear defective portions located in the plurality of second regions have a second light exiting direction, and projections of the first light exiting direction and the second light exiting direction on at least one plane comprising a normal line of a surface of the photonic crystal film substrate are respectively inclined in different directions with respect to the normal line.

For example, in the optical film provided by an embodiment of the present disclosure, an angle between the projection of the first light exiting direction on the at least one plane comprising the normal line of the surface of the photonic crystal film substrate and the normal line is in a range from 17° to 55°, an angle between the projection of the second light exiting direction on the at least one plane comprising the normal line of the surface of the photonic crystal film substrate and the normal line is in a range from 17° to 55°.

For example, in the optical film provided by an embodiment of the present disclosure, the first light exiting direction and the second light exiting direction are located in a same plane comprising the normal line of the surface.

For example, in the optical film provided by an embodiment of the present disclosure, the linear defective portions comprise a straight linear defective portion, and a shape of the straight linear defective portion comprises a straight line.

For example, in the optical film provided by an embodiment of the present disclosure, the first light exiting direction of the straight linear defective portion located in the first region is the same as an extension direction of the straight linear defective portion located in the first region, the second light exiting direction of the straight linear defective portion located in the second region is the same as an extension direction of the straight linear defective portion located in the second region.

For example, in the optical film provided by an embodiment of the present disclosure, the linear defective portion comprises a folded linear defective portion, and a shape of the folded linear defective portion comprises a folded line.

For example, in the optical film provided by an embodiment of the present disclosure, the folded linear defective portion comprises a straight linear light exiting portion close to the surface, and the first light exiting direction of the folded linear defective portion located in the first region is the same as an extension direction of the straight linear light exiting portion of the folded linear defective portion located in the first region, and the second light exiting direction of the folded linear defective portion located in the second region is the same as an extension direction of the straight linear light exiting portion of the folded linear defective portion located in the second region.

For example, in the optical film provided by an embodiment of the present disclosure, a band gap of the photonic crystal film substrate is in a range from 390 nm to 780 nm.

For example, in the optical film provided by an embodiment of the present disclosure, the first region comprises a plurality of first sub regions arranged in a line in a direction perpendicular to an arrangement direction of the plurality of first regions and the plurality of second regions, the second region comprises a plurality of second sub regions arranged in a line in a direction perpendicular to the arrangement direction of the plurality of first regions and the plurality of second regions, each of the first sub regions comprises the linear defective portions having different first light exiting directions, and each of the second sub regions comprises the linear defective portions having different second light exiting directions.

At least one embodiment of the present disclosure provides a display device, comprising: a display panel, comprising a plurality of first pixels and a plurality of second pixels and an optical film, located on a light exiting side of the display panel; wherein the optical film comprises any one of the abovementioned optical films, the plurality of first pixels are configured to display a first image, and the plurality of second pixels are configured to display a second image, the plurality of first regions cover the plurality of first pixels, light of the first image is transmitted out through the linear defective portions located in the first regions, and the plurality of second regions covers the plurality of second pixels, and light of the second image is transmitted out through the linear defective portions located in the second regions.

For example, in the display device provided by an embodiment of the present disclosure, the first region comprises a plurality of first sub regions arranged in a line in a direction perpendicular to an arrangement direction of the plurality of first regions and the plurality of second regions, the second region comprises a plurality of second sub regions arranged in a line in a direction perpendicular to the arrangement direction of the plurality of first regions and the plurality of second regions, each of the first sub regions comprises linear defective portions having different first light exiting directions, and each of the second sub regions comprises the linear defective portions having different second light exiting directions; wherein the plurality of first sub regions are disposed in a one-to-one correspondence with the plurality of first pixels, and the plurality of second sub regions are disposed in a one-to-one correspondence with the plurality of second pixels.

For example, in the display device provided by an embodiment of the present disclosure, the display panel comprises a liquid crystal display panel or an organic light emitting display panel.

At least one embodiment of the present disclosure provides a manufacturing method of an optical film, comprising: forming a photonic crystal film substrate; dividing the photonic crystal film substrate into a plurality of first regions and a plurality of second regions, the plurality of first regions and the plurality of second regions being alternately distributed along at least one direction in a plane where the photonic crystal film substrate is located; and forming a plurality of linear defective portions penetrating the photonic crystal film substrate in a thickness direction of the photonic crystal film substrate in the photonic crystal film substrate, wherein, a lattice period of each of the linear defective portions is disposed to be different from a lattice period of the photonic crystal film substrate, the linear defective portions located in the plurality of first regions have a first light exiting direction, and the linear defective portions located in the plurality of second regions have a second light exiting direction, and projections of the first light exiting direction and the second light exiting direction on at least one plane comprising a normal line of a surface of the photonic crystal film substrate are respectively inclined in different directions with respect to the normal line.

For example, in the manufacturing method of an optical film provided by an embodiment of the present disclosure, forming the plurality of linear defective portions penetrating the photonic crystal film substrate in the thickness direction of the photonic crystal film substrate in the photonic crystal film substrate comprises: irradiating the photonic crystal film substrate with a laser along an irradiation direction to form the plurality of linear defective portions penetrating the photonic crystal film substrate in the thickness direction of the photonic crystal film substrate, the irradiation direction comprising the first light exiting direction and the second light exiting direction.

For example, in the manufacturing method of an optical film provided by an embodiment of the present disclosure, forming the plurality of linear defective portions penetrating the photonic crystal film substrate in the thickness direction of the photonic crystal film substrate in the photonic crystal film substrate further comprises: observing forming state of the linear defective portion in the photonic crystal film substrate with an image sensor; and adjusting the irradiation direction of the laser to form the plurality of linear defective portions penetrating the photonic crystal film substrate in the thickness direction of the photonic crystal film substrate in the photonic crystal film substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
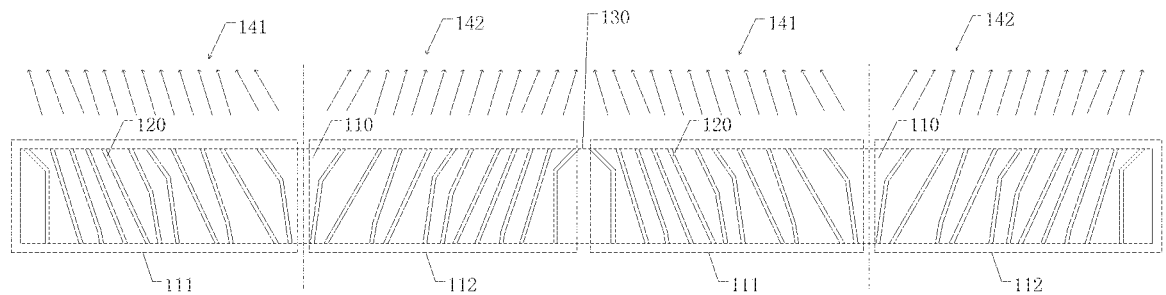
FIG. 1 is a schematic structural diagram of a structure of an optical film provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise,"

"comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

The inventor(s) of the present application has noticed that, during a driving process of a vehicle, in order to ensure safety, the driver is prohibited from watching programs such as television and movies; sometimes, the driver also needs to watch a map or navigation. However, during the driving process of the vehicle, passengers other than the driver are allowed to watch television, movies and other programs. A typical on-board display device cannot allow the driver and passengers other than the driver to see different images on the same on-board display device.

The embodiments of the present disclosure provide an optical film, a manufacturing method thereof and a display device. The optical film includes a photonic crystal film substrate and a plurality of linear defective portions, the plurality of linear defective portions are located in the photonic crystal film substrate and penetrate the photonic crystal film substrate in a thickness direction of the photonic crystal film substrate. The photonic crystal film substrate has a surface, and a lattice period of each of the linear defective portions is different from a lattice period of the photonic crystal film substrate. The photonic crystal film substrate includes a plurality of first regions and a plurality of second regions. The plurality of first regions and the plurality of second regions are alternately distributed along at least one direction in a plane where the photonic crystal film substrate is located. The linear defective portions located in the first regions have a first light exiting direction, the linear defective portions located in the second regions have a second light exiting direction, and projections of the first light exiting direction and the second light exiting direction on at least one plane including a normal line of the surface of the photonic crystal film substrate are respectively inclined in different directions with respect to the normal line. Thus, the optical film can block visible light from passing through by adjusting a band gap range of the photonic crystal film substrate, and can form light passages through the linear defective portions having different lattice periods, so that light is transmitted in a specific direction. In addition, because the linear defective portions located in the first region and the linear defective portions located in the second region have different light exiting directions, the optical film can be employed to achieve dual view display.

Hereafter, the optical film, the manufacturing method thereof, and the display device provided by the embodiments of the present disclosure will be described with reference to the accompanying drawings.

An embodiment of the present disclosure provides an optical film. FIG. 1 is a schematic view illustrating a structure of an optical film according to the present embodiment. As illustrated in FIG. 1, the optical film includes a photonic crystal film substrate 110 and a plurality of linear defective portions in the photonic crystal film substrate 110, the plurality of linear defective portions penetrate the photonic crystal film substrate 110 in a thickness direction of the photonic crystal film substrate 110. A lattice period of each of the linear defective portions 120 is different from a lattice period of the photonic crystal film substrate 110. The photonic crystal film substrate 110 has a surface 130. The photonic crystal film substrate 110 includes a plurality of first regions 111 and a plurality of second regions 112 (only two first regions 111 and two second regions are illustrated in FIG. 1). The plurality of first regions 111 and the plurality of second regions 112 are alternately distributed along at least one direction in a plane where the photonic crystal film substrate 110 is located. The linear defective portions 120 located in the first region 111 have a first light exiting direction 141, and the linear defective portions 120 located in the second region 112 have a second light exiting direction 142. Projections of the first light exiting direction 141 and the second light exiting direction 142 on at least one plane including a normal line of the surface of the photonic crystal film substrate are respectively inclined in different directions with respect to the normal line. For example, as illustrated in FIG. 1, projections of the first light exiting direction 141 and the second light exiting direction 142 on a plane (equivalent to a plane where the paper surface in FIG. 1 is located), which includes a normal line of the surface 130 of the photonic crystal film substrate and is parallel with an arrangement direction of the plurality of the first regions 111 and the plurality of the second regions 112, are respectively inclined in different directions with respect to the normal line. It should be noted that, the above-mentioned thickness direction of the photonic crystal film substrate refers to a direction from a main surface of the photonic crystal film substrate to a surface opposite to the main surface, including but not limited to a direction perpendicular to the main surface. The above-mentioned surface is a main surface of the photonic crystal film substrate. In addition, the first light exiting direction includes but not limited to a specific light exiting direction, and the first light exiting direction can be a range of the light exiting direction. The second light exiting direction includes but is not limited to a specific light exiting direction, and the second light exiting direction can be a range of the light exiting direction.

In the optical film provided by the present embodiment, because the lattice period of the photonic crystal film substrate is different from the lattice period of the linear defective portion, the photonic crystal of a specific lattice period allows only light with a specific wavelength range to pass through, and light with other wavelengths is not allowed to pass through. Therefore, visible light can be not allowed to pass through by adjusting the band gap range of the photonic crystal film substrate, in this case, the linear defective portions with different lattice periods can allow visible light to pass through. In addition, because the photonic crystals around the linear defective portions can block the passage of visible light, the visible light can be totally reflected in the linear defective portions and can propagate along extension directions of the linear defective portions. That is, the linear defective portions can form a light passage, so that the light can be transmitted in a specific direction. In addition, because the linear defective portions located in the first region and the linear defective portions located in the second region have different light exiting directions, the light configured to display the first image can be transmitted from the first region along the first light exiting direction, the light configured to display the second image can be transmitted from the second region along the second light exiting direction. Projections of the first light exiting direction and the second light exiting direction on at least one plane including a normal line of a surface of the photonic crystal film substrate are respectively inclined in different directions with respect to the normal line, thus different images can be observed in different directions, which helps to achieve dual view display. In addition, because the light is totally reflected in the linear defective portion instead of being absorbed, the optical transmittance of the optical film is high.

For example, the optical film provided in the present embodiment can be disposed on the display panel, and the plurality of first regions and the plurality of second regions alternately distributed can correspond to the pixels in odd-numbered columns and the pixels in even-numbered columns which are alternately arranged on the display panel. Pixels in odd-numbered columns can display a first image, such as a map image, a navigation image, and the like; pixels in even-numbered columns can display a second image, such as a movie image. Light of the first image can be transmitted from the plurality of first regions along the linear defective portions located in the first region. Light of the second image can be transmitted from the plurality of second regions along the linear defective portions located in the second region. Therefore, in the first light exiting direction, the first image can be seen and the second image cannot be seen; and in the second lighting direction, the second image can be seen and the first image cannot be seen, thereby achieving a dual view display.

Figure 2:
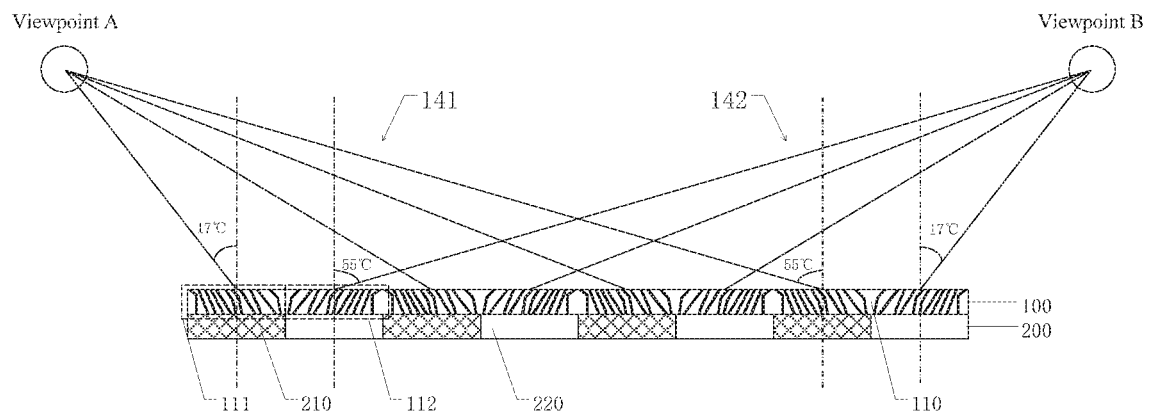
FIG. 2 is a schematic diagram of an optical film provided by an embodiment of the present disclosure.

For example, in the optical film provided in an example of the present embodiment, an angle between the projection of the first light exiting direction on the at least one plane including the normal line of the surface of the photonic crystal film substrate and the normal line is in a range from 17° to 55°, an angle between the projection of the second light exiting direction on the at least one plane including the normal line of the surface of the photonic crystal film substrate and the normal line is in a range from 17° to 55°. For example, FIG. 2 is a schematic view of an optical film according to the present embodiment. To clearly and briefly illustrate the present embodiment, the first light exiting direction 141 and the second light exiting direction 142 are located on the plane including the normal line of the surface 130, and the plane is parallel with an arrangement direction of the plurality of first regions and the plurality of second regions, the projections of the first light exiting direction 141 and the second light exiting direction 142 on the plane (that is, the first light exiting direction and the second light exiting direction) are respectively inclined in different directions with respect to the normal line. The angle between the projection of the first light exiting direction on the plane and the normal line is in the range from 17° to 55°, and the angle between the projection of the second exiting direction on the plane and the normal line is in the range from 17° to 55°. Thus, the first light exiting direction 141 is inclined toward the left side in FIG. 2 with respect to the normal line and is directed toward viewpoint A, and the second light exiting direction 142 is inclined with respect to the normal line to the right side in FIG. 2 and is directed toward viewpoint B.

For example, as illustrated in FIG. 2, the above-mentioned at least one plane can include a plane including the normal line of the surface 130 and parallel with the arrangement direction of the first regions 111 and the second regions 112, corresponding to the plane where the paper surface in FIG. 2 is located.

For example, in the optical film provided in an example of the present embodiment, as illustrated in FIG. 2, the first light exiting direction 141 and the second light exiting direction 142 are located in the same plane including the normal line of the surface 130. That is, an angle between projections of the first light exiting direction and the second light exiting direction on the surface is 180°. Of course, embodiments of the present disclosure include, but are not limited thereto. The first light exiting direction and the second light exiting direction can also be located in different planes including the normal line of the surface. That is, an angle between projections of the first light exiting direction and the second light exiting direction on the surface is not 180°, as long as the first light exiting direction and the second light exiting direction are different, and the first light exiting direction and the second light exiting direction can form different viewpoints.

Figure 3:
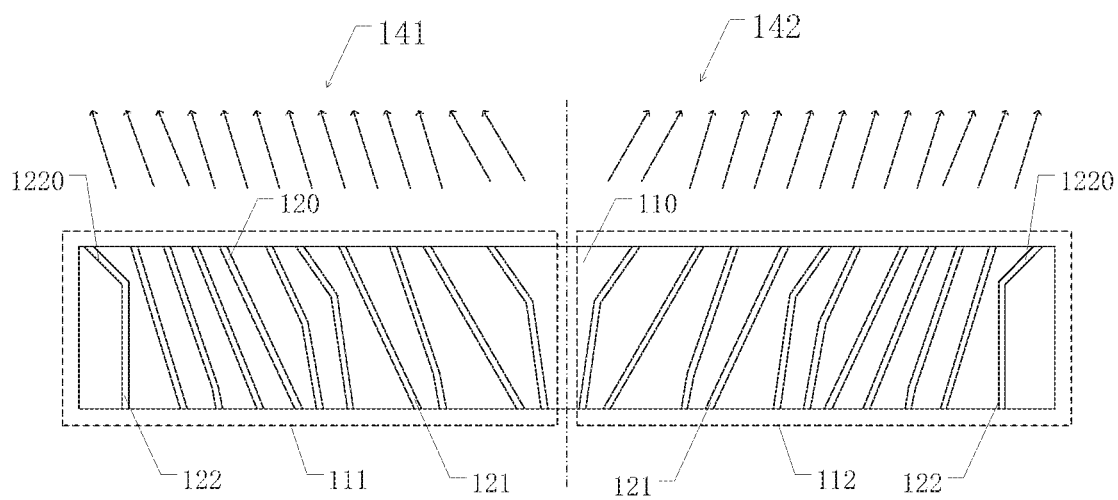
FIG. 3 is a schematic partial diagram of a part of an optical film provided by an embodiment of the present disclosure.

For example, FIG. 3 is a schematic view illustrating a part of an optical film provided according to an example of the present embodiment. In the optical film provided by an example of the present embodiment, as illustrated in FIG. 3, the linear defective portion 120 includes a straight linear defective portion 121 and a folded linear defective portion 122. The shape of the straight linear defective portion 121 includes a straight line, and a shape of the folded linear defective portion 122 includes a fold line. That is, the linear defective portion can be a linear defective portion penetrating the photonic crystal film substrate in a straight line, and the linear defective portion can be a linear defective portion penetrating the photonic crystal film substrate along a folding line. Because the linear defective portion includes the straight linear defective portion and the folded linear defective portion, the straight linear defective portion and the folded linear defective portion can be easily fabricated with respect to a curve defect.

For example, in the optical film provided in an example of the present embodiment, as illustrated in FIG. 3, the first light exiting direction 141 of the straight linear defective portions 121 located in the first region 111 is the same as an extension direction of the straight linear defective portions 121 located in the first region 111. Similarly, the second light exiting direction of the straight linear defective portions 121 located in the second region 112 is the same as an extension direction of the straight linear defective portions 121 located in the second region 121.

For example, in the optical film provided in an example of the present embodiment, as illustrated in FIG. 3, the folded linear defective portion 122 includes a linear light exiting portion 1220 close to the surface 130, and the first light exiting direction 141 of the folded linear defective portion 122 in the first region 111 is the same as an extension direction of the linear light exiting portion 1220 of the folded linear defective portion 122 in the first region 111, the second light exiting direction 142 of the folded line portion 122 in the second region 112 is the same as an extension direction of the linear light exiting portion 1220 located in the second region 112. Because the extension direction of the linear defective portion usually has a certain inclination angle, a part of the surface cannot be provided with the linear defective portion, and by providing the folded linear defective portion, the optical film provided in the present embodiment can increase the density of the linear defective portion and increase the light transmittance of the optical film.

For example, in the optical film provided in an example of the present embodiment, the photonic crystal film substrate has a band gap range of 390-780 nm. As a result, the photonic crystal film substrate with the band gap range of 390-780 nm can block visible light from passing through thereof.

Figure 4:
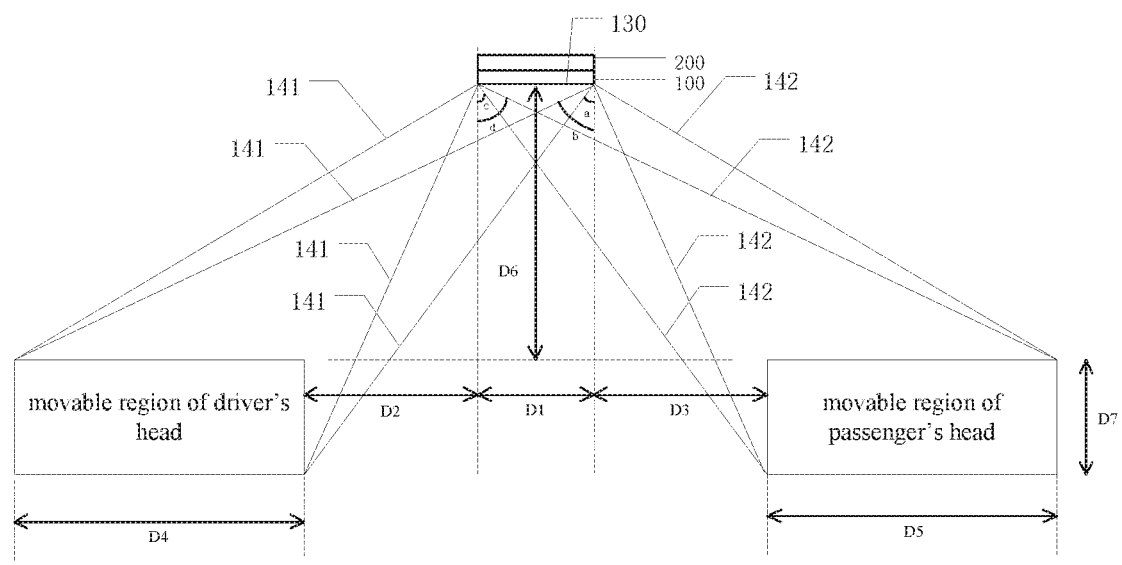
FIG. 4 is a work schematic diagram of an optical film provided by an embodiment of the present disclosure.
Figure 5A:
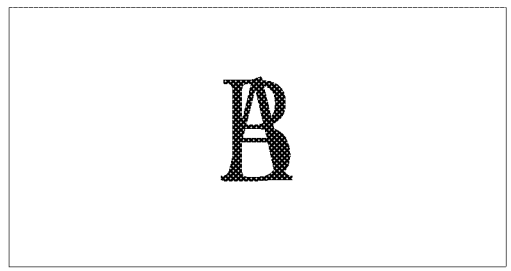
FIG. 5a is an image displayed by a display panel provided by an embodiment of the present disclosure.
Figure 5B:
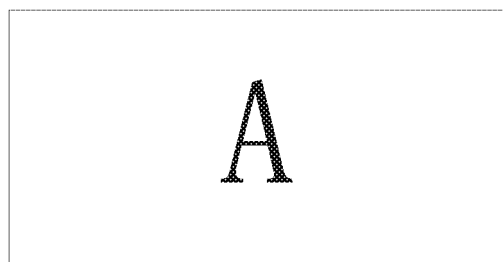
FIG. 5b is an image displayed by pixels in odd-numbered columns of a display panel provided by an embodiment of the present disclosure.
Figure 5C:
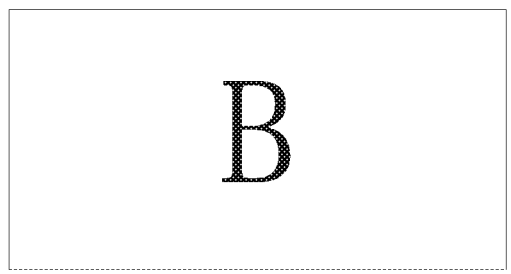
FIG. 5c is an image displayed by pixels in even-numbered columns of a display panel provided by an embodiment of the present disclosure.

FIG. 4 is a schematic view of an operation of an optical film according to the present embodiment. As illustrated in FIG. 4, the optical film 100 provided in the present embodiment can be disposed on the display panel 200, and the plurality of first regions and the plurality of second regions which are alternately distributed on the optical film 100 correspond to pixels in odd-numbered columns and pixels in even-numbered columns which are alternately distributed on the display panel 2 respectively. An image displayed by the display panel viewed at front can be as illustrated in FIG. 5a, the pixels in odd-numbered columns can display a first image such as a map image, a navigation image, etc., as illustrated in FIG. 5b. The pixels in even-numbered columns can display a second image such as a movie image, as illustrated in FIG. 5c. The first region, the second region, and the pixel are not illustrated in FIG. 4 because of their small sizes. As illustrated in FIG. 4, the first light exiting direction 141 and the second light exiting direction 142 are located on a plane including the normal line of the surface 130, and the plane is parallel with the arrangement direction of the plurality of first regions and the plurality of second regions. The projections of the first light exiting direction 141 and the second light exiting direction 142 on the plane (i.e., the first light exiting direction and the second light exiting direction) are respectively inclined in different directions with respect to the normal line. Thus, the first light exiting direction 141 is inclined with respect to the normal line to the left side in FIG. 4 and directed toward a movable region of the driver's head, and the second light exiting direction 142 is inclined with respect to the normal line to the right side in FIG. 4 and directed toward a movable region of the passenger's head, so that the driver can observe the first image such as a map image or a navigation image, and cannot see the second image such as a movie image, the passenger can observe the second image such as a movie image, and cannot see the first image such as a map image or a navigation image. It should be noted that, a range of an angle between the projection of the first light exiting direction on the plane and the normal line can be set according to the position of the movable region of the driver's head and the position of the display panel. Likewise, a range of an angle between the projection of the second light exiting direction on the plane and the normal line can be set according to the position of the movable region of the passenger's head and the position of the display panel. For example, as illustrated in FIG. 4, the maximum value of the range of the angle between the projection of the first light exiting direction on the plane and the normal line can be obtained through a trigonometric function based on a vertical distance D6 between the position of the pixels at the rightmost odd-numbered column in FIG. 4 and the movable region of the driver's head, a width D1 of the display panel, a horizontal distance D2 between the display panel and the movable region of the driver's head, and a length D4 of the movable region of the driver's head. The minimum value of the range of the angle between the projection of the first light exiting direction on the plane and the normal line can be obtained through a trigonometric function based on a vertical distance D6 between the position of the pixels at the leftmost odd-numbered column in the FIG. 4, a width D7 of a movable region of the driver's head, and a horizontal distance D2 between the display panel and a movable region of the driver's head. Similarly, the maximum value of the range of the angle between the projection of the second light exiting direction on the plane and the normal line can be obtained through a trigonometric function based on a vertical distance D6 between the position of the pixels at the leftmost even-numbered column in FIG. 4 and the movable region of the driver's head, the width D1 of the display panel, a horizontal distance D3 between the display panel and the movable region of the passenger's head, and a length D5 of the movable region of the passenger's head. The minimum value of the range of the angle between the projection of the second light exiting direction on the plane and the normal line can be obtained through a trigonometric function based on a vertical distance D6 between the position of the pixels at the rightmost even-numbered column in FIG. 4 and the movable region of the passenger's head, a width D7 of the movable region of the passenger's head, and a horizontal distance D3 between the display panel and the movable region of the passenger's head.

Figure 6:
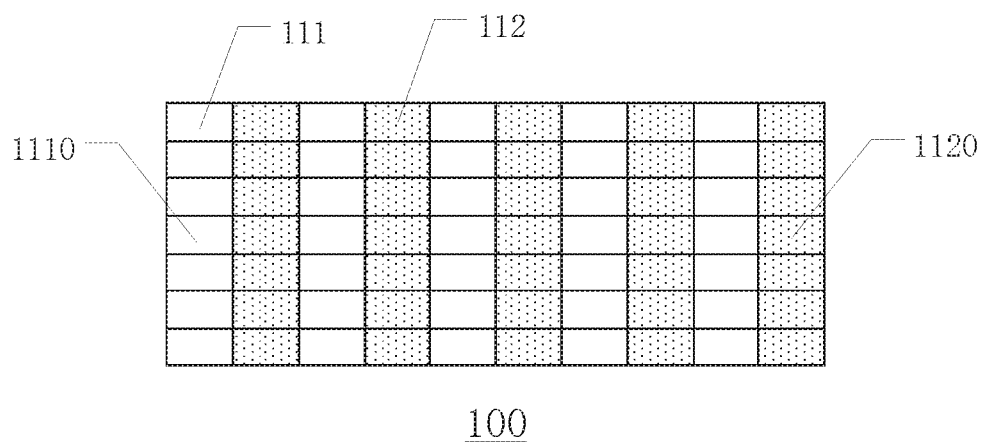
FIG. 6 is a planar view of an optical film provided by an embodiment of the present disclosure.

An embodiment of the present disclosure provides an optical film. FIG. 6 is a schematic plan view of an optical film according to the present embodiment. As illustrated in FIG. 6, the present embodiment is different from the first embodiment in that, the first region 111 includes a plurality of first sub regions arranged in a line in a direction perpendicular to an arrangement direction of the plurality of first regions 111 and the plurality of second regions 112. The second region 112 includes a plurality of second sub regions 1120 arranged in a line in a direction perpendicular to the arrangement direction of the plurality of first regions 111 and the plurality of second regions 112. Each of the first sub regions 1110 includes a plurality of linear defective portions (not illustrated in the figure) having different first light exiting directions, and each of the second sub regions 1120 includes a plurality of linear defective portions having different second light exiting directions. Thus, each of the first sub regions includes a plurality of linear defective portions having different first light exiting directions. On one hand, with respect to provide only one linear defective portion in each of the first sub regions, providing the plurality of linear defective portions in each of the first sub regions can make full use of the first sub region, thereby increasing the light transmittance. On the other hand, the plurality of linear defective portions in each first sub region have different first light exiting directions, thereby increasing visual range of the pixels corresponding to the first sub region. Similarly, each second sub region includes a plurality of linear defective portions having different second light exiting directions, thereby not only improving the light transmittance, but also increasing visible range of the pixels corresponding to the second sub region.

Figure 7:
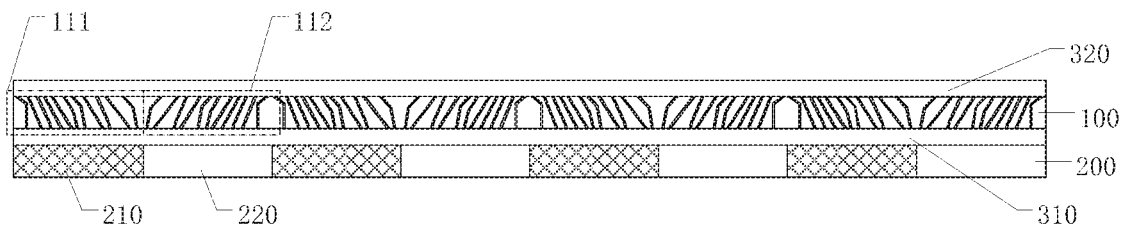
FIG. 7 is a schematic structural diagram of a structure of a display device provided by an embodiment of the present disclosure.

An embodiment of the present disclosure provides a display device. FIG. 7 is a schematic view illustrating a structure of a display device according to the present embodiment. As illustrated in FIG. 7, the display device includes a display panel 200 and an optical film 100, and the optical film 100 is disposed on a light exiting side of the display panel 200. The optical film 100 can be any one of the optical films of the first and second embodiments. The display panel 200 includes a plurality of first pixels 210 for displaying a first image and a plurality of second pixels 220 for displaying a second image, and the plurality of first regions 111 covers the plurality of first pixels 210, light of the first image is transmitted out through the linear defective portion 120 located in the first region 111, the plurality of second regions 112 covers the plurality of second pixels 220, and light of the second image is transmitted out through the linear defective portion 120 located in the second region 112.

In the display device provided in the present embodiment, the linear defective portions located in the first region and the linear defective portions located in the second region have different light exiting directions, light of the first image is transmitted out from the first region along the first light exiting direction, and light of the second image is transmitted out from the second region along the second light exiting direction, and projections of the first light exiting direction and the second light exiting direction on at least one plane including the normal line of a surface of the photonic crystal film substrate are inclined with respect to the normal line, so that different images can be observed in different directions, and a dual view display can be achieved. In addition, because the light is totally reflected in the linear defective portions and not absorbed, the optical transmittance of the optical film is high, and the display device also has a high light transmittance.

For example, in the display device provided by an example of the present embodiment, the plurality of first regions and the plurality of second regions which are alternately distributed correspond to the pixels in odd-numbered columns and the pixels in even-numbered columns which are alternately distributed on the display panel. Pixels in odd-numbered columns can display a first image, such as a map image, a navigation image, and the like; pixels in even-numbered columns can display a second image, such as a movie image. Light of the first image can be transmitted out from the plurality of first regions along the linear defective portions located in the first regions. Light of the second image can be transmitted out from the plurality of second regions along the linear defective portions located in the second regions. At this time, in the first light exiting direction, the first image can be seen and the second image cannot be seen; in the second lighting direction, the second image can be seen and the first image cannot be seen, thereby achieving a dual view display.

For example, in the display device provided in an example of the present embodiment, as illustrated in FIG. 7, the display device further includes a first optical film 310 and a second optical film 320. The first optical film 310 is located between the display panel 200 and the optical film 100, and the second optical film 320 is located at a side of the optical film 100 away from the display panel 200. The first optical film 310 and the second optical film 320 can play a role of adhesion and protection respectively.

Figure 8:
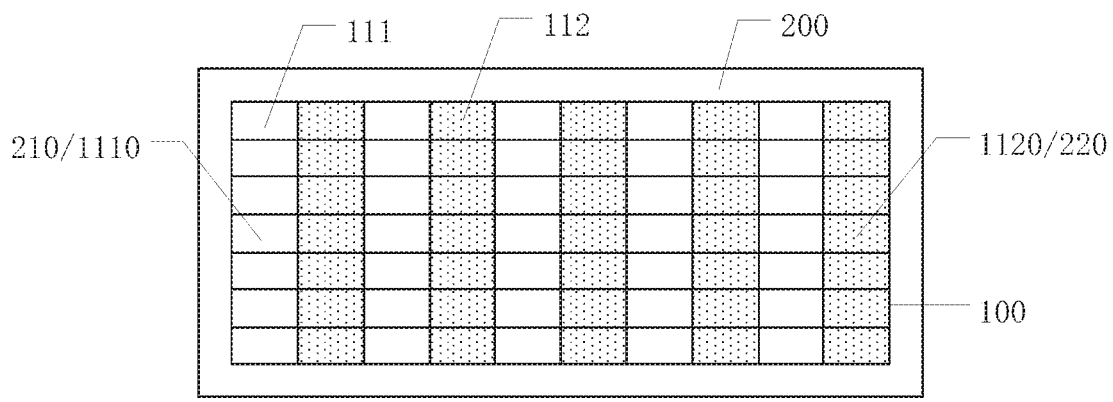
FIG. 8 is a planar view of a display device provided by an embodiment of the present disclosure.

For example, FIG. 8 is a schematic plan view of a display device according to the present embodiment. As illustrated in FIG. 8, the first region 111 of the optical film 100 includes a plurality of first sub regions 1110 arranged in a line in a direction perpendicular to an arrangement direction of the plurality of first regions 111 and the plurality of second regions 112. The second region 112 includes a plurality of second sub regions 1120 arranged in a line in a direction perpendicular to the arrangement direction of the plurality of first regions 111 and the plurality of second regions 112. Each of the first sub regions 1110 includes a plurality of linear defective portions 120 having different first light exiting directions, each of the second sub regions 1120 includes a plurality of linear defective portions 120 having different second light exiting directions. The plurality of first sub regions 1110 are provided in a one-to-one correspondence with the plurality of first pixels 210, and the plurality of second sub regions 1120 are provided in a one-to-one correspondence with the plurality of second pixels 220. Thus, each of the first sub regions includes a plurality of linear defective portions having different first light exiting directions. On one hand, with respect to provide only one linear defective portion in each of the plurality of first sub regions, providing the plurality of linear defective portions in each of the first sub regions can make full use of the first sub region, thereby increasing the light transmittance. On the other hand, the plurality of linear defective portions in each first sub region have different first light exiting directions, resulting in increasing visual range of the pixels corresponding to the first sub region. Similarly, each of the plurality of second sub regions includes a plurality of linear defective portions having different second light exiting directions, resulting in not only improving the light transmittance, but also increasing visible range of the pixels corresponding to the second sub region.

For example, in the display device provided by an example of the present embodiment, the first image includes a map image, and the second image includes a movie image. The display device can be an on-board display device so that the driver can observe the first image, such as a map image or a navigation image, but cannot observe the second image, such as a movie image, and the co-driver can observe the second image, such as a movie image, and cannot observe the first image, such as a map image or a navigation image.

For example, in the display device provided in an example of the present embodiment, the display panel can be a liquid crystal display panel or an organic light emitting display panel.

Figure 9:
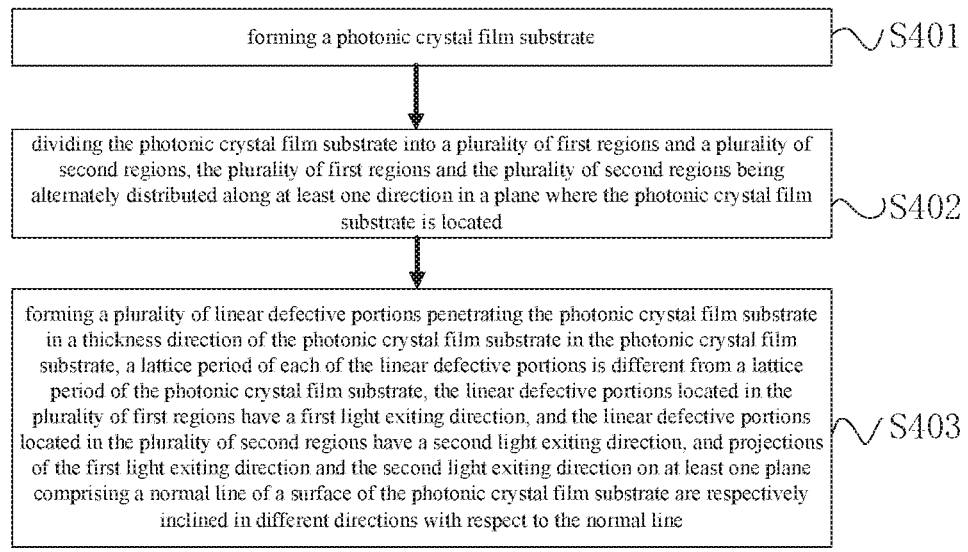
FIG. 9 is a flowchart of a manufacturing method of an optical film provided by an embodiment of the present disclosure.

An embodiment of the present disclosure provides a manufacturing method of an optical film. FIG. 9 is a manufacturing method of an optical film according to the present embodiment. As illustrated in FIG. 9, the manufacturing method of the optical film includes the following steps S401-S403.

Step S401: forming a photonic crystal film substrate.

For example, the photonic crystal thin film substrate is manufactured by using iron-doped lithium niobate ($LiNbO_3$: Fe).

Step S402, dividing the photonic crystal film substrate into a plurality of first regions and a plurality of second regions, the plurality of first regions and the plurality of second regions being alternately distributed along at least one direction in a plane where the photonic crystal film substrate is located.

Step S403: forming a plurality of linear defective portions penetrating the photonic crystal film substrate in a thickness direction of the photonic crystal film substrate in the photonic crystal film substrate, in which, a lattice period of each of the linear defective portions is different from a lattice period of the photonic crystal film substrate, the linear defective portions located in the plurality of first regions have a first light exiting direction, and the linear defective portions located in the plurality of second regions have a second light exiting direction, and projections of the first light exiting direction and the second light exiting direction on at least one plane including a normal line of a surface of the photonic crystal film substrate are respectively inclined in different directions with respect to the normal line.

In the manufacturing method of an optical film provided in the present embodiment, the linear defective portions having different lattice periods are formed in the photonic crystal film substrate, and the photonic crystal of a specific lattice period allows only light with a specific wavelength range to pass through, while light with other wavelength ranges is not allowed to pass through. Therefore, visible light can be not allowed to pass through by setting the band gap range of the photonic crystal film substrate, and in this case, the linear defective portions with different lattice periods can allow visible light to pass through; and the photonic crystals around the linear defective portions can block the passage of visible light. The visible light can be totally reflected in the linear defective portions and can propagate along the extension direction of the linear defective portion. That is, the linear defective portion can form a light passage, so that the light can be transmitted in a specific direction. In addition, because the linear defective portion located in the first region and the linear defective portion located in the second region have different light exiting directions, the light displaying the first image can be transmitted from the first region along the first light exiting direction, the light displaying the second image can be transmitted from the second region along the second light exiting direction, and the projections of the first light exiting direction and the second light exiting direction on at least one plane including the normal line of the surface are respectively inclined in different directions with respect to the normal line, so that different images can be observed in different directions, which can assist in achieving dual view display.

For example, in the manufacturing method of an optical film provided in an example of the present embodiment, the step of forming the plurality of linear defective portions penetrating the photonic crystal film substrate along the thickness direction of the photonic crystal film substrate in the photonic crystal film substrate can includes: irradiating the photonic crystal film substrate with a laser in an irradiation direction to form the plurality of linear defective portions penetrating the photonic crystal film substrate in the thickness direction of the photonic crystal film substrate. The irradiation direction includes the first light exiting direction and the second light exiting direction. Thus, the plurality of linear defective portions are formed in the photonic crystal film substrate by using a laser irradiating method, on the one hand, the difficulty of forming the plurality of linear defective portions can be reduced, and on the other hand, the directivity of the linear defective portions can be increased. It should be noted that, the first light exiting direction includes but is not limited to a specific light exiting direction, and the first light exiting direction can be a light exiting direction in a range. The second light exiting direction includes but is not limited to a specific light exiting direction, and the first light exiting direction can be a light exiting direction in a range.

For example, in the manufacturing method of an optical film provided in an example of the present embodiment, forming the plurality of linear defective portions penetrating the photonic crystal film substrate in the thickness direction of the photonic crystal film substrate in the photonic crystal film substrate further include: observing forming state of the linear defective portion in the photonic crystal film substrate with an image sensor; and adjusting the irradiation direction of the laser to form the plurality of linear defective portions penetrating the photonic crystal film substrate in the thickness direction of the photonic crystal film substrate in the photonic crystal film substrate. The forming state of the linear defective portion can be monitored by an image sensor, such as a CCD image sensor, so that the irradiation direction of the laser can be adjusted in time, thereby improving the yield of the product.

With respect to the present disclosure, the following statements should be noted.

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. An optical film, comprising:
a photonic crystal film substrate;
a plurality of linear defective portions, located in the photonic crystal film substrate and penetrating the photonic crystal film substrate in a thickness direction of the photonic crystal film substrate;
wherein a lattice period of each of the linear defective portions is different from a lattice period of the photonic crystal film substrate, and the photonic crystal film substrate comprises a plurality of first regions and a plurality of second regions, and the plurality of first regions and the plurality of second regions are alternately distributed along at least one direction in a plane where the photonic crystal film substrate is located, the linear defective portions located in the plurality of first regions have a first light exiting direction, and the linear defective portions located in the plurality of second regions have a second light exiting direction, and projections of the first light exiting direction and the second light exiting direction on at least one plane comprising a normal line of a surface of the photonic crystal film substrate are respectively inclined in different directions with respect to the normal line,
wherein the first region comprises a plurality of first sub regions arranged in a line in a direction perpendicular to an arrangement direction of the plurality of first regions and the plurality of second regions, the second region comprises a plurality of second sub regions arranged in a line in a direction perpendicular to the arrangement direction of the plurality of first regions and the plurality of second regions, each of the first sub regions comprises the linear defective portions having different first light exiting directions, and each of the second sub regions comprises the linear defective portions having different second light exiting directions.

2. The optical film according to claim 1, wherein an angle between the projection of the first light exiting direction on the at least one plane comprising the normal line of the surface of the photonic crystal film substrate and the normal line is in a range from 17° to 55°, an angle between the projection of the second light exiting direction on the at least one plane comprising the normal line of the surface of the photonic crystal film substrate and the normal line is in a range from 17° to 55°.

3. The optical film according to claim 1, wherein the first light exiting direction and the second light exiting direction are located in a same plane comprising the normal line of the surface.

4. The optical film according to claim 1, wherein the linear defective portions comprise a straight linear defective portion, and a shape of the straight linear defective portion comprises a straight line.

5. The optical film according to claim 4, wherein the first light exiting direction of the straight linear defective portion located in the first region is the same as an extension direction of the straight linear defective portion located in the first region, the second light exiting direction of the straight linear defective portion located in the second region is the same as an extension direction of the straight linear defective portion located in the second region.

6. The optical film according to claim 1, wherein the linear defective portion comprises a folded linear defective portion, and a shape of the folded linear defective portion comprises a folded line.

7. The optical film according to claim 6, wherein the folded linear defective portion comprises a straight linear light exiting portion close to the surface, and the first light exiting direction of the folded linear defective portion located in the first region is the same as an extension direction of the straight linear light exiting portion of the folded linear defective portion located in the first region, and the second light exiting direction of the folded linear defective portion located in the second region is the same as an extension direction of the straight linear light exiting portion of the folded linear defective portion located in the second region.

8. The optical film according to claim 1, wherein a band gap of the photonic crystal film substrate is in a range from 390 nm to 780 nm.

9. A display device, comprising:
  a display panel, comprising a plurality of first pixels and a plurality of second pixels; and
  an optical film, located on a light exiting side of the display panel;
  wherein the optical film comprises the optical film according to claim 1, the plurality of first pixels are configured to display a first image, and the plurality of second pixels are configured to display a second image, the plurality of first regions cover the plurality of first pixels, light of the first image is transmitted out through the linear defective portions located in the first regions, and the plurality of second regions covers the plurality of second pixels, and light of the second image is transmitted out through the linear defective portions located in the second regions,
  wherein the first region comprises a plurality of first sub regions arranged in a line in a direction perpendicular to an arrangement direction of the plurality of first regions and the plurality of second regions, the second region comprises a plurality of second sub regions arranged in a line in a direction perpendicular to the arrangement direction of the plurality of first regions and the plurality of second regions, each of the first sub regions comprises the linear defective portions having different first light exiting directions, and each of the second sub regions comprises the linear defective portions having different second light exiting directions; wherein the plurality of first sub regions are disposed in a one-to-one correspondence with the plurality of first pixels, and the plurality of second sub regions are disposed in a one-to-one correspondence with the plurality of second pixels.

10. The display device according to claim 9, wherein the display panel comprises a liquid crystal display panel or an organic light emitting display panel.

11. The optical film according to claim 2, wherein the linear defective portions comprise a straight linear defective portion, and a shape of the straight linear defective portion comprises a straight line.

12. The optical film according to claim 3, wherein the linear defective portions comprise a straight linear defective portion, and a shape of the straight linear defective portion comprises a straight line.

13. The optical film according to claim 2, wherein the linear defective portion comprises a folded linear defective portion, and a shape of the folded linear defective portion comprises a folded line.

14. The optical film according to claim 3, wherein the linear defective portion comprises a folded linear defective portion, and a shape of the folded linear defective portion comprises a folded line.

* * * * *